Jan. 22, 1929.
R. L. LYONS
1,699,796
CLUTCH AND STOP MECHANISM
Filed July 15, 1927   2 Sheets-Sheet 1
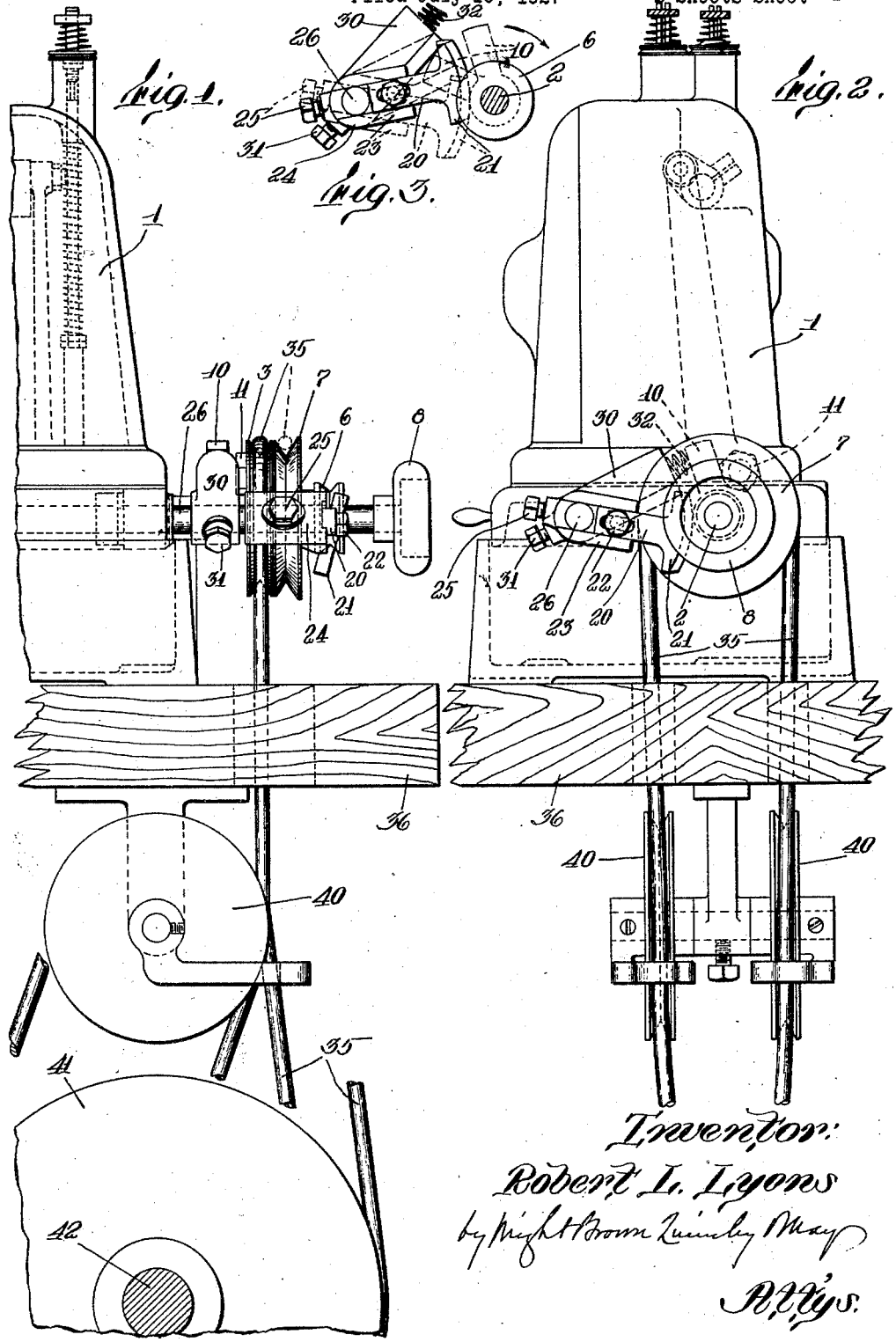
Inventor:
Robert L. Lyons Jan. 22, 1929.
R. L. LYONS
CLUTCH AND STOP MECHANISM
Filed July 15, 1927     2 Sheets-Sheet 2
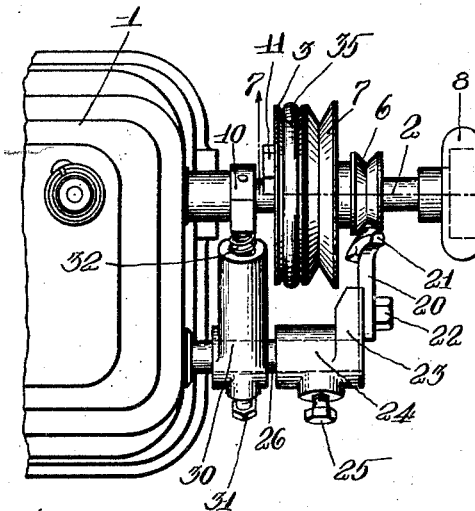
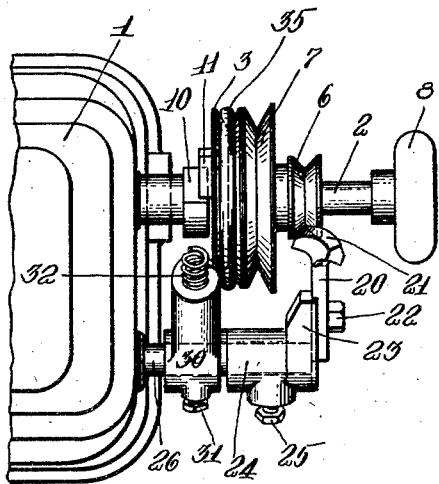
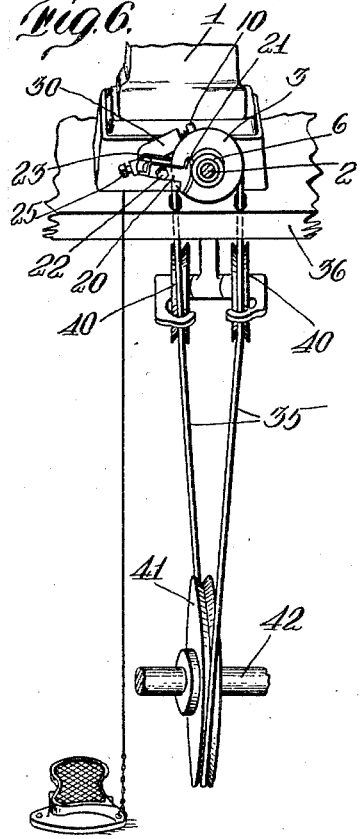
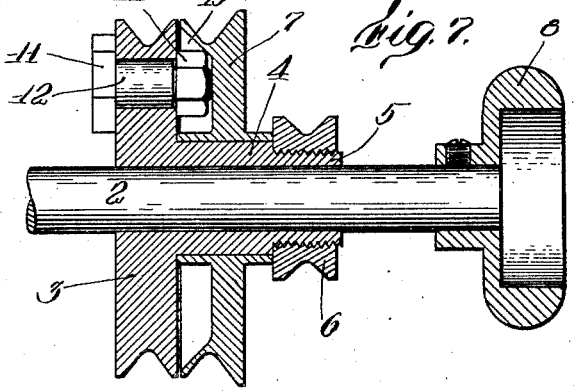
Inventor:
Robert L. Lyons Patented Jan. 22, 1929.

1,699,796

UNITED STATES PATENT OFFICE.

ROBERT L. LYONS, OF WALTHAM, MASSACHUSETTS, ASSIGNOR TO FREDERICK OSANN COMPANY, OF NEW YORK, N. Y., A CORPORATION OF NEW YORK.

CLUTCH AND STOP MECHANISM.

Application filed July 15, 1927. Serial No. 206,018.

A clutch and stop mechanism particularly suitable for controlling high speed light machines comprises a drive pulley journaled on the driven shaft, and slidable axially to and from a position in which a driving lug thereon is in driving relation to a lug on the shaft. For controlling the axial position of the pulley there is provided a rockable member, which, when rocked to position to hold the pulley out of driving axial relation, interposes a stop to the rotation of the shaft. While this mechanism is quite satisfactory in operation for the particular service intended, it does not permit turning the machine over by hand without operatively disconnecting the power from the drive pulley since rocking of the stop out of stopping relation so that the shaft may be turned at once moves the pulley into driving position.

The present invention, therefore, has for its object to provide a mechanism of this general type so designed that it may be placed at will into a condition permitting the shaft to be rotated by hand and to be returned readily to its normal operative condition. For this purpose a second loose pulley is mounted adjacent to the drive pulley but with no driving connection thereto, so that the drive belt may be shifted to this loose pulley when it is desired to turn the shaft by hand. When this has been done the stop may be removed and the driving pulley clutched to the shaft without the shaft being driven and at the same time the belt is held in its normal condition about its own driving pulley in condition to be shifted back to the driving pulley of the clutch mechanism whenever desired.

For a more complete understanding of this invention, reference may be had to the accompanying drawings in which Figure 1 is a fragmentary side elevation of a sewing machine showing the mechanism applied thereto.

Figure 2 is a rear elevation thereof.

Figure 3 is a diagrammatic detail showing successive positions of the control and stop member relative to the shaft and driving lug.

Figures 4 and 5 are top plans of the mechanism shown in stopped and driving positions, respectively.

Figure 6 is a fragmentary perspective showing the driving connections.

Figure 7 is a section to an enlarged scale on line 7—7 of Figure 4.

Referring to these figures, 1 indicates a portion of the frame of a sewing machine, though it should be understood that the mechanism is as applicable to any other light high speed machine, this machine having a rotary driving shaft 2 journaled therein and suitably connected to operate the sewing or other operative instrumentalities. The shaft 2 has journaled thereon, with capability of axial movement, a belt pulley 3. This belt pulley, as shown best in Figure 7, is provided with an extended hub portion 4 on one side, terminating in a reduced threaded portion 5 on which may be engaged a grooved cam pulley 6. This grooved cam pulley serves to retain in position on the hub portion 4 and idle pulley 7, which is freely journaled on the hub portion. The outer end of the shaft 2 may be provided with a hand wheel 8 by which it may be turned manually. On the opposite side of the pulley 3 from its hub portion 4 the shaft 2 has fixed thereon a drive and stop lug 10. This lug 10 projects radially from the shaft 2 in position to be engaged by the head 11 of a bolt 12 extending through the pulley 3 whenever the pulley 3 is in an axial position adjacent thereto. The bolt 12 is shown as held in position in the pulley 3 by means of a nut 14 engaging its inner threaded end, and in order to provide for free rotation of the pulley 7 it is provided with an annular groove or channel 15 in one face within which the nut 14 may freely ride.

In order to control the axial position of the pulley 3 so as to bring its drive lug 11 into and out of driving relation with the shaft lug 10, a cam element 20 having a cam face 21 engaging within the groove of the cam pulley 6 is provided. As shown this cam member 20 is fixed as by means of a screw 22 to an arm 23 carried by a collar 24, this collar 24 being fixed as by means of a set screw 25 to a rock shaft 26. The cam face 21 is arranged at an angle to the perpendicular to the shaft 2 so that as this member is rocked by rocking of the shaft 26, it moves the pulley 3 axially of the shaft 2 so as to bring the drive lug 11 into or out of driving relation to the shaft lug 10 depending on the direction of rocking of this member.

The shaft lug 10 is also employed as one element of a stop mechanism so that when the drive pulley 3 is out of driving relation thereto, the lug 10 may be engaged by a stop element to stop the rotation of the shaft 2 in a definite angular position. As shown in Figures 3, 4 and 5 the stop element comprises a member 30 also fixed to the rock shaft 26, as by means of a set screw 31, and having a socket at its outer end within which is positioned a cushioning spring 32. This stop element 30 lies in the plane of rotation of the shaft lug 10 so that when the rock shaft 26 is rocked in one direction, its end portion containing the spring 32 will lie in the path of rotation of the shaft lug 10 which will impinge on the spring 32 and its rotation be stopped. When in this stopping position (shown by dotted lines in Figure 3 and in Figure 4) the cam member 20 is in such a position that the driving lug comprising the bolt head 11 carried by the pulley 3 is out of driving relation to the lug 10, and when the rock shaft 26 is rocked to remove the stop 30 from the path of motion of the lug 10 (as shown in full lines in Figure 3 and in Figure 5), the cam 20 moves the pulley 3 axially to bring it into driving relation to the lug 10. It will thus be seen that whenever the stop is in operative position the drive pulley 3 is out of clutching engagement to the shaft 2, and when the stop lug is out of stopping position the pulley 3 is in driving relation to the shaft 2. As long, therefore, as the driving pulley 3 is being rotated by its driving belt shown at 35, it is impossible to remove the stop element so that the shaft 2 may be turned without causing this shaft to be connected to the drive pulley so as to be driven thereby. By shifting the drive belt 35, however, from the pulley 3 to the pulley 7, the pulley 3 is no longer driven and even though this pulley be moved into position so that its driving lug is in driving relation to the shaft lug 10, the shaft 2 may be turned by hand by engaging the hand wheel 8.

Referring to Figures 1, 2 and 6, it will be seen that the drive pulley belt 35 passes down through suitable openings in a table 36 on which the machine is mounted, about a pair of idler pulleys 40 therebeneath, and about a pulley 41 on a power countershaft 42. By the provision of the pulley 7 of substantially the same diameter as the pulley 3 and with its belt face substantially a continuation of the belt face of the pulley 3, the belt 35 is held in operative relation to the pulleys 40 and 41 at all times. This is important for the reason that if the belt 35 were merely removed from the pulley 3 without being properly supported by the pulley 7, it would become disengaged from the pulley 41, and as this is positioned beneath the work table it might be a difficult matter to thereafter engage it with the pulley 41 when it was desired to resume operation of the machine with the belt 35 on the pulley 3. By reason of the loose pulley 7, therefore, the proper relation of the belt 35 to its driving pulley 41 is maintained and at the same time the shaft 2 may be turned over by hand, the stop 30 being swung out of stopping relation and the pulley 3 moved to its axial position where it is in driving relation to the shaft 2.

Having thus described an embodiment of this invention it should be evident to those skilled in the art that various changes and modifications might be made therein without departing from its spirit or scope as defined by the appended claims.

I claim:

1. A device of the class described comprising a rotary shaft, a drive lug on said shaft, a belt pulley journaled on said shaft and movable axially thereof, a lug on said pulley movable by the axial motion of said pulley into and out of driving relation to said shaft lug, a stop movable into and out of shaft-stopping position, means for moving said pulley axially as said stop is moved to bring said shaft into shaft-stopping position as said pulley is moved out of driving position and to move said pulley into driving position as said stop is moved out of stopping position, and a freely rotatable second pulley adjacent to said first pulley and out of driving relation therewith and on to which the belt may be shifted from said belt pulley.

2. In a device of the class described comprising a rotary shaft, a belt pulley journaled on said shaft, means for positively stopping the rotation of said shaft, means actuable to render said stopping means inoperative and to couple said shaft to the pulley to cause said shaft to be driven by said pulley, and a loose pulley to which the driving belt of said pulley may be shifted when it is desired to render said stopping means inoperative without causing said belt to rotate said shaft.

3. A device of the class described comprising a rotatable shaft, a belt pulley journaled on said shaft and movable axially thereon, said belt pulley having an extended hub portion, a second pulley journaled on said hub portion and having a belt face in substantial continuity with the belt face of said belt pulley, a drive lug carried by said belt pulley, a grooved pulley carried by said hub outwardly of said second pulley, a lug extending from said shaft and into driving relation to which said drive lug is placed when said belt pulley is in one axial position, a stop lug movable into and out of the path of rotation of said shaft lug, and a member movable with said stop lug and engaging within the groove of said grooved pulley to control the axial position of said pulleys, to cause said drive lug to be out of driving position when said stop lug is in said path and to cause said drive lug to be in driving rotation when said stop lug is out of said path.

In testimony whereof I have affixed my signature.

ROBERT L. LYONS.